(12) United States Patent
Sugimoto et al.

(10) Patent No.: US 9,090,790 B2
(45) Date of Patent: Jul. 28, 2015

(54) WATER-BASED INK FOR INK-JET RECORDING, INK CARTRIDGE, INK-JET RECORDING APPARATUS, INK-JET RECORDING METHOD, METHOD FOR PRODUCING WATER-BASED INK FOR INK-JET RECORDING, AND METHOD FOR PREVENTING CORROSION OF METAL MEMBER OF INK-JET RECORDING APPARATUS

(75) Inventors: Junichiro Sugimoto, Nagoya (JP); Ryuji Kato, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 745 days.

(21) Appl. No.: 13/035,133

(22) Filed: Feb. 25, 2011

(65) Prior Publication Data

US 2011/0244135 A1    Oct. 6, 2011

(30) Foreign Application Priority Data

Mar. 31, 2010   (JP) ................................ 2010-082847

(51) Int. Cl.
*C09D 11/324* (2014.01)

(52) U.S. Cl.
CPC .................................... *C09D 11/324* (2013.01)

(58) Field of Classification Search
USPC ........................................................ 523/160
See application file for complete search history.

(56) References Cited

U.S. PATENT DOCUMENTS

| 6,648,954 | B2 | 11/2003 | Uemura et al. |
| 7,235,126 | B2 | 6/2007 | Tani et al. |
| 2002/0050226 | A1* | 5/2002 | Oki et al. ................... 106/31.46 |
| 2003/0121446 | A1 | 7/2003 | Taniguchi et al. |
| 2004/0259978 | A1 | 12/2004 | Tani et al. |
| 2005/0124726 | A1 | 6/2005 | Yatake et al. |
| 2005/0275701 | A1* | 12/2005 | Aoi et al. ....................... 347/100 |
| 2006/0201380 | A1 | 9/2006 | Kowalski et al. |
| 2007/0100023 | A1 | 5/2007 | Burns et al. |
| 2007/0100024 | A1* | 5/2007 | Gu et al. ........................ 523/160 |
| 2008/0241398 | A1 | 10/2008 | Kato et al. |
| 2008/0295730 | A1* | 12/2008 | Aoyama .................... 106/14.44 |
| 2011/0073004 | A1 | 3/2011 | Kato et al. |

FOREIGN PATENT DOCUMENTS

| JP | 2000-345086 | 12/2000 |
| JP | 2002-332436 | 11/2002 |
| JP | 2003-136831 | 5/2003 |
| JP | 2003-253178 | 9/2003 |

(Continued)

OTHER PUBLICATIONS

U.S. Appl. No. 12/748,427, filed Mar. 28, 2010.

(Continued)

*Primary Examiner* — Nathan T Leong
(74) *Attorney, Agent, or Firm* — Banner & Witcoff, Ltd.

(57) ABSTRACT

There is provided a water-based ink for ink-jet recording including a self-dispersible carbon black modified by carboxylic acid group, a water, and a water-soluble organic solvent, wherein a weight concentration of phosphate ion in the water-based ink is not more than 35 ppm. The water-based ink for ink-jet recording has excellent water resistance and is capable of lowering or preventing corrosion of a metal member, in an ink-jet recording apparatus, contacting with the water-based ink for ink-jet recording.

8 Claims, 2 Drawing Sheets

(56) References Cited

FOREIGN PATENT DOCUMENTS

| | | |
|---|---|---|
| JP | 2004-098403 | 4/2004 |
| JP | 2005-008725 | 1/2005 |
| JP | 2008524400 | 7/2008 |
| JP | 2008-246821 | 10/2008 |
| JP | 2009-513802 | 3/2010 |
| JP | 2011-074198 | 4/2011 |
| WO | 03-033602 | 4/2003 |

OTHER PUBLICATIONS

Office Action mailed Sep. 28, 2011 in U.S. Appl. No. 12/748,427.

* cited by examiner

WATER-BASED INK FOR INK-JET RECORDING, INK CARTRIDGE, INK-JET RECORDING APPARATUS, INK-JET RECORDING METHOD, METHOD FOR PRODUCING WATER-BASED INK FOR INK-JET RECORDING, AND METHOD FOR PREVENTING CORROSION OF METAL MEMBER OF INK-JET RECORDING APPARATUS

CROSS REFERENCE TO RELATED APPLICATION

The present application claims priority from Japanese Patent Application No. 2010-082847 filed on Mar. 31, 2010 the disclosure of which is incorporated herein by reference in its entirety.

BACKGROUND OF THE INVENTION

1. Field of the Invention

The present invention relates to a water-based ink for ink-jet recording, an ink cartridge, an ink-jet recording apparatus, an ink-jet recording method, a method for producing a water-based ink for ink-jet recording, and a method for preventing corrosion of a metal member (metal part or component) of an ink-jet recording apparatus.

2. Description of the Related Art

In the ink-jet recording, a water-based ink using a self-dispersible carbon black is used in some cases. Since the self-dispersible carbon black does not require any polymeric pigment dispersant, the self-dispersible carbon black is capable of preventing the viscosity of the water-based ink from increasing, and has excellent discharge stability and storage stability. A self-dispersible carbon black, which is modified in particular with the sulfonate group, has a satisfactory dispersion stability of the pigment for a long period of time, and thus such self-dispersible carbon black is widely used. The self-dispersible carbon black modified by the sulfonate group has, however, unsatisfactory water resistance. Therefore, it is desired to use a self-dispersible carbon black modified by the carboxylic acid group which has excellent water resistance (for example, see Japanese Patent Application laid-open No. 2005-8725).

In an water-based ink for ink-jet recording using the self-dispersible carbon black modified by the carboxylic acid group, however, there is a fear that corrosion might occur in a metal member, in an ink-jet recording apparatus, which comes into contact with the water-based ink for ink-jet recording.

An aspect of the present teaching has an object to provide a water-based ink having excellent water resistance and capable of lowering or preventing the corrosion of a metal member, in an ink-jet recording apparatus, which contacts with the water-based ink for ink-jet recording.

SUMMARY OF THE INVENTION

According to a first aspect, there is provided a water-based ink for ink-jet recording including a self-dispersible carbon black modified by carboxylic acid group, a water, and a water-soluble organic solvent; wherein a weight concentration of phosphate ion in the water-based ink for ink-jet recording is not more than 35 ppm.

According to a second aspect, there is provided an ink cartridge including the water-base ink for ink-jet recording of the first aspect.

According to a third aspect, there is provided an ink-jet recording apparatus including an ink accommodating section in which the ink cartridge of the second aspect is accommodated; an ink-jet head which discharges the water-based ink for ink-jet recording accommodated in the ink accommodating section; and a metal member which comes into contact with the water-based ink for ink-jet recording.

According to a fourth aspect, there is provided an ink-jet recording method including preparing the water-based ink for ink-jet recording of the first aspect; and performing recording by discharging the water-based ink for ink-jet recording onto an object.

According to a fifth aspect, there is provided a method for producing a water-based ink for ink-jet recording, the method including: mixing a self-dispersible carbon black modified by carboxylic acid group, water, and a water-soluble organic solvent; and removing phosphate ion contained in one of the self-dispersible carbon black modified by the carboxylic acid group, the water and the water-soluble organic solvent; wherein a weight concentration of phosphate ion in the water-based ink for ink-jet recording is not more than 35 ppm.

According to a sixth aspect, there is provided a method for preventing corrosion of a metal member, of an ink-jet recording apparatus, which comes into contact with a water-based ink for ink-jet recording, the method including: preparing, as the water-based ink for ink-jet recording, a water-based ink containing a self-dispersible carbon black modified by carboxylic acid group, a water, and a water-soluble organic solvent, a weight concentration of phosphate ion in the water-based ink being not more than 35 ppm; and bringing the water-based ink into contact with the metal member.

In the water-based ink for ink-jet recording of the aspect of the present teaching, the self-dispersible carbon black modified by the carboxylic acid group (carboxylic acid group-modified self-dispersible carbon black) is used as the colorant and the weight concentration of the phosphate ion in the water-based ink is made to be not more than 35 ppm. By doing so, the water-based ink for ink-jet recording is excellent in water resistance and is capable of lowering or preventing the corrosion of a metal member, in an ink-jet recording apparatus, coming into contact with the water-based ink for ink-jet recording.

DESCRIPTION OF THE PREFERRED EMBODIMENTS

Figure 1:
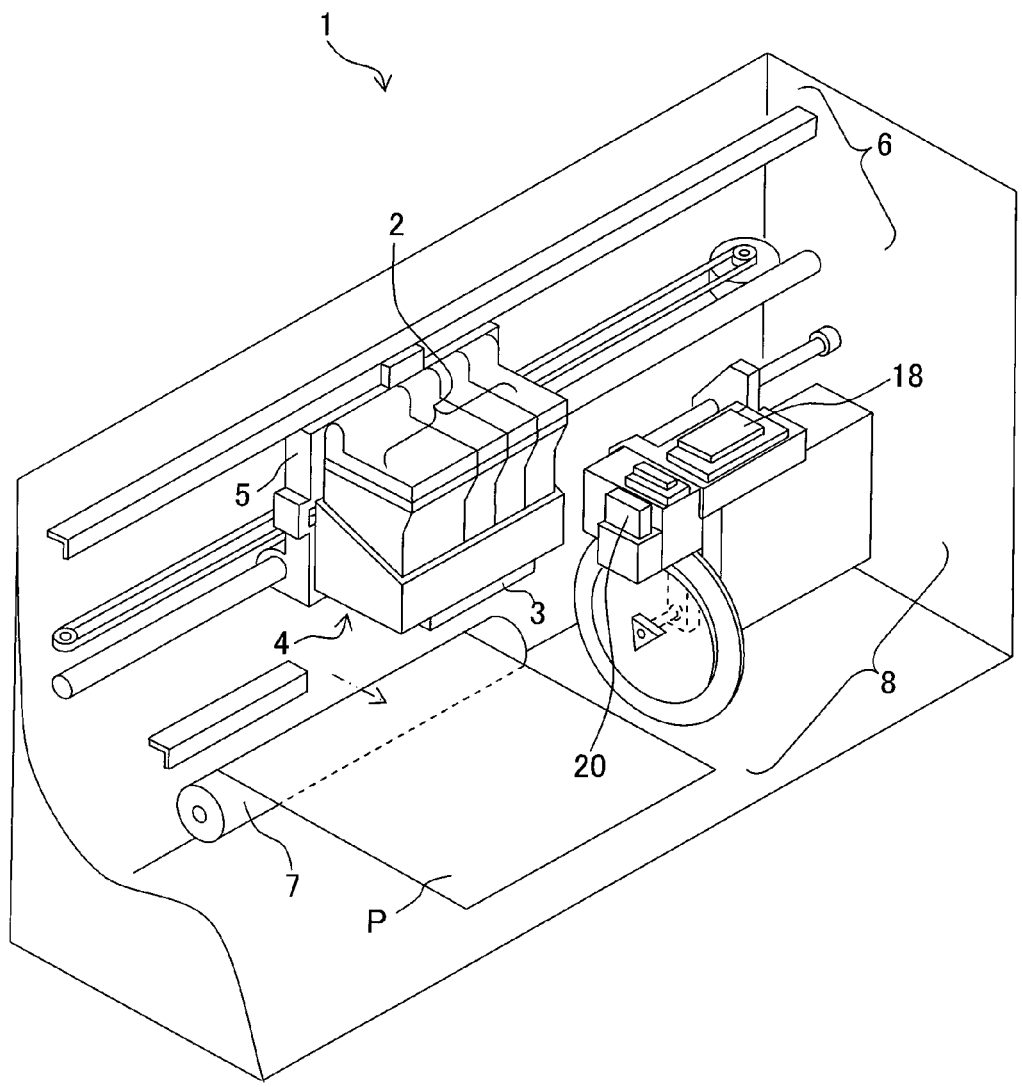
FIG. 1 is a schematic perspective view showing an example of the construction of an ink-jet recording apparatus of a fourth embodiment.

An explanation will be given about a water-based ink for ink-jet recording (hereinafter referred to simply as "water-based ink" or "ink"), as a first embodiment of the present teaching. The water-based ink of the first embodiment contains a colorant, water, and a water-soluble organic solvent. As described above, the colorant includes the carboxylic acid group-modified self-dispersible carbon black. As the carboxylic acid group-modified self-dispersible carbon black, for example, a commercially available product may be used. The commercially available product is exemplified by "CAB-O-JET (trade name) 300" produced by Cabot Specialty Chemicals, etc. The water-based ink may contain a polymeric pigment dispersant; or it is allowable that the water-based ink does not contain any polymeric pigment dispersant. In a case that the water-based ink contains the polymeric pigment dispersant, it is preferable that the polymeric pigment dispersant is contained in the ink in an amount to an extent not affecting the viscosity of the water-based ink. As described above, since the water-based ink of the first embodiment uses the self-dispersible pigment as described above, there is not any problem of the increase in viscosity which would be otherwise caused by the polymeric pigment dispersant; and the water-based ink of the first embodiment has excellent discharge stability and storage stability.

The blending amount (solid content blending amount; pigment ratio; pigment solid content) of the carboxylic acid group-modified self-dispersible carbon black with respect to the entire water-based ink is not particularly limited, and may be appropriately determined based on, for example, desired optical density or color (hue, tint), etc. The pigment ratio is, for example, 0.1% by weight to 20% by weight, is preferably 1% by weight to 10% by weight, and is more preferably 2% by weight to 8% by weight.

The colorant may include a pigment, a dye, etc. which is/are different from the carboxylic acid group-modified self-dispersible carbon black, in addition to the carboxylic acid group-modified self-dispersible carbon black.

The water is preferably ion-exchanged water or pure water (purified water). The blending amount of the water with respect to the entire water-based ink (water ratio) is, for example, 10% by weight to 90% by weight, and is preferably 40% by weight to 80% by weight. The water ratio may be balance of other components.

The water-soluble organic solvent includes, for example, a humectant which prevents the water-based ink from drying at an end of the nozzle in the ink-jet head and/or a penetrant which adjusts the drying speed of the water-based ink on a recording medium.

The humectant is not particularly limited, and includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyvalent alcohols such as polyalkylene glycols, alkylene glycols, and glycerol; 2-pyrrolidone; N-methyl-2-pyrrolidone; and 1,3-dimethyl-2-imidazolidinone. The polyalkylene glycol is not limited, and includes, for example, polyethylene glycol and polypropylene glycol. The alkylene glycol is not limited, and includes, for example, ethylene glycol, propylene glycol, butylenes glycol, diethylene glycol, triethylene glycol, dipropylene glycol, tripropylene glycol, thiodiglycol, and hexylene glycol. It is allowable that only one type of the humectant as described above is used, or two or more types of the humectants are used. Among the above-described humectants, it is preferable to use polyvalent alcohols such as alkylene glycol and glycerol.

The blending amount of the humectant with respect to the entire water-based ink is, for example, 0% by weight to 95% by weight, is preferably 5% by weight to 80% by weight, and is more preferably 5% by weight to 50% by weight.

The penetrant is not limited, and includes, for example, glycol ether. The glycol ether is not limited, and includes, for example, ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. It is allowable that only one type of the penetrant as described above is used, or two or more types of the penetrants are used.

The blending amount of the penetrant with respect to the entire water-based ink (penetrant ratio) is, for example, 0% by weight to 20% by weight. By making the penetrant ratio within the above-described range, it is possible to make the permeability of the water-based ink into the recording medium to be more suitable. The penetrant ratio is preferably 0.1% by weight to 15% by weight, and is more preferably 0.5% by weight to 10% by weight.

The concentration of the phosphate ion (phosphate ion concentration) in the water-based ink is not more than 35 ppm by weight concentration, as described above. By making the phosphate ion weight concentration be not more than 35 ppm, it is possible to lower or prevent the corrosion of a metal member, in or of the ink-jet recording apparatus, which comes into contact with the water-based ink, and in particular possible to effectively prevent the corrosion of a metal member containing or including nickel. The metal member can be exemplified, for example, by a metal member in or of an ink-jet head (for example, a filter, an ink channel inside the ink-jet head, etc.), an ink channel up to the ink-jet head, etc. Further, according to the embodiment, it is possible to lower or prevent the corrosion of the metal member coming into contact with the water-based ink in the ink-jet recording apparatus; and thus it is also possible to prevent clogging (blockage) of the ink channel which would be otherwise caused by the corrosion (adhesion of the pigment), etc. It is preferable that the phosphate ion concentration is as low as possible, and the lower limit is not particularly limited, which is for example 0 (measurable limit). A method for adjusting the phosphate ion concentration is, for example, as indicated in a method for producing the water-based ink which will be described later on.

The water-based ink which uses the carboxylic acid group-modified self-dispersible carbon black tends to corrode the metal member. In the corroded metal member, since a corroded portion of the metal (metal member) is colored, it is assumed that the corrosion is caused by the carboxylic acid group-modified self-dispersible carbon black and that the carboxylic acid group on the surface of the pigment is involved. The inventors found out, through a series of diligent research and study, that the phosphate ion in the water-based ink is a substance which promote the corrosion of the metal by the carboxylic acid group-modified self-dispersible carbon black, and that the corrosion of the metal member, which contacts with the ink, in the ink-jet recording apparatus can be lowered or prevented by making the phosphate ion concentration in the water-based ink be not more than 35 ppm. Although the mechanism for the above-described corrosion-lowering effect or corrosion-preventing effect is not clear, it is assumed that the phosphate ion has any interaction with the carboxylic acid group-modified self-dispersible carbon black and the surface of the metal and promotes the adhesion of the carboxylic acid group-modified self-dispersible carbon black to the surface of the metal. Accordingly, even with respect to the water-based ink using the carboxylic acid group-modified self-dispersible carbon black, it is possible to obtain a water-based ink which hardly corrode the metal by making the phosphate ion concentration be not more than 35 ppm. It is assumed that the phosphate ion and the carboxylic acid group-modified self-dispersible carbon black have any chemical interaction therebetween and affect the corrosion of the metal.

The water-based ink preferably further contain 1,2,3-benzotriazole. By containing 1,2,3-benzotriazole in the water-based ink, it is possible to greatly enhance the effect of lowering or preventing corrosion of the metal member contacting with the water-based ink in the ink-jet recording apparatus. Benzotriazoles are rust-preventing agents (corrosion-preventing agent) which prevent corrosion of metal by chemically adsorbing to a surface of the metal and forming a protective film thereon. In the ink of the embodiment, 1,2,3-benzotriazole particularly has an excellent rust-preventing effect. Although the mechanism for the above-described corrosion-preventing effect is not clear, it is assumed that the water-based ink of the embodiment, which contains the carboxylic acid group-modified self-dispersible carbon black and in which the phosphate ion concentration is made to be not more than 35 ppm, does not inhibit the formation of protective film, by 1,2,3-benzotriazole, on the surface of the metal. The blending amount of 1,2,3-benzotriazole with respect to the entire water-based ink is, for example, 0.005% by weight to 5% by weight, is preferably 0.01% by weight to 1% by weight, is more preferably 0.05% by weight to 0.5% by weight, and is further more preferably 0.1% by weight to 0.3% by weight.

The water-based ink may further contain a conventionally known additive, if necessary. The additive includes, for example, surfactants, pH-adjusting agents, viscosity-adjusting agents, surface tension-adjusting agents, and fungicides. The viscosity-adjusting agents include, for example, polyvinyl alcohol, cellulose, water-soluble resin, etc.

An explanation will be given, as a second embodiment, about a method for producing the water-based ink for ink-jet recording of the first embodiment. The water-based ink of the first embodiment can be prepared, for example, such that a colorant, water, and a water-soluble organic solvent, and optionally other additive component(s) as necessary are mixed uniformly or homogeneously by any conventionally known method, and by removing undissolved matters by a filter or the like, except that in the second embodiment the phosphate ion concentration is made to be not more than 35 ppm.

The phosphate ion is a substance which is a possibility of being contained (present), as an impurity, in various chemicals, pigments, water, etc. When the water-based ink is prepared by using a material having a low purity, unpurified material, etc., then the water-based ink contains the phosphate ion in a concentration of not less than 35 ppm. Accordingly, in order to make the phosphate ion concentration in the water-based ink be not more than 35 ppm, a material having a high purity or a purified material is used to prepare the water-based ink. It is allowable to perform, as necessary, removal of the phosphate ion in the production process of the water-based ink. It is also allowable to perform the removal of the phosphate ion with respect to a material (component) for the water-based ink. Alternatively, it is allowable that while preparing the water-based ink, namely in a state that the components or materials are mixed, the phosphate ion is removed from the mixture. As a method for removing the phosphate ion, it is possible to use, for example, a publicly known method such as the ultrafiltration method, ion-exchange method and phosphate ion absorption method using boehmite, etc. In particular, a method for producing the water-based ink including a step of removing the phosphate ion from a carbon black dispersion, in which the carboxylic acid group-modified self-dispersible carbon black is dispersed in water, by the ultrafiltration method is preferable since it is possible to easily obtain a water-based ink having the phosphate ion concentration of not more than 35 ppm.

Figure 2:
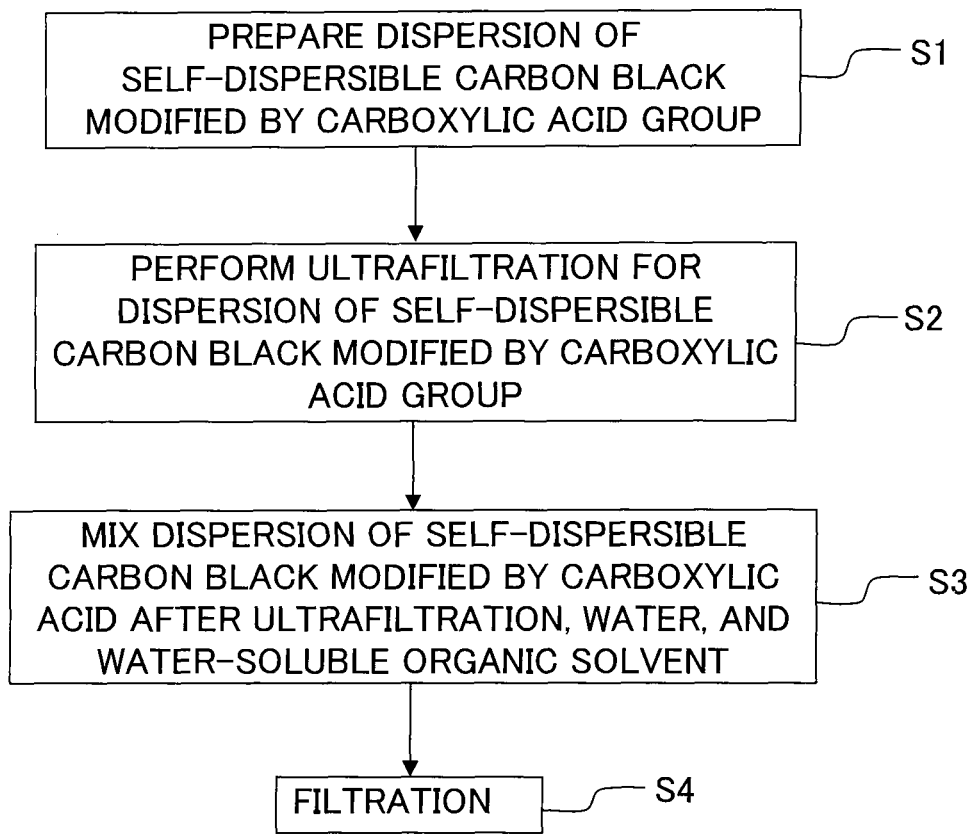
FIG. 2 is a flow chart showing a method for producing a water-based ink for ink-jet recording according to a second embodiment.

The water-based ink can be produced, for example, by a method as follows in accordance with a flow chart shown in FIG. 2. The following producing method, however, is merely an example, and it not intended to limit the present teaching.

First, a carbon black dispersion, in which the carboxylic acid group-modified self-dispersible carbon black is dispersed in the water, is prepared (Step S1). Next, the ultrafiltration is performed for the carbon black dispersion (Step S2). For example, the carbon black dispersion is placed in a commercially available ultrafiltration set and then is subjected to centrifugal filtration by a centrifugal separator. Afterwards, the carboxylic acid group-modified self-dispersible carbon black remaining on the filter of the ultrafiltration set is recovered and is dispersed again in pure water. By repeating the ultrafiltration operation and the re-dispersion operation, a required or necessary amount of dispersion of the carboxylic acid group-modified self-dispersible carbon black (carboxylic acid group-modified self-dispersible carbon black dispersion) is obtained.

On the other hand, components except for the carboxylic acid group-modified self-dispersible carbon black (the water and the water-soluble organic solvent, and optionally other additive component(s) as necessary) are mixed uniformly or homogeneously to obtain an ink solvent. With respect to the ink solvent, it is also allowable to remove the phosphate ion in a similar manner to that performed for the carboxylic acid group-modified self-dispersible carbon black dispersion. Alternatively, it is allowable to use, as the component(s) of the ink solvent, a super-high purity product(s). Subsequently, the ink solvent is added to the carboxylic acid group-modified self-dispersible carbon black dispersion for which the re-dispersion operation is performed, followed by being mixed uniformly in a publicly known method (Step S3). Finally, the obtained mixture is filtrated through a filter, etc. to remove undissolved matter(s) (Step S4), thereby obtaining a water-based ink for ink-jet recording.

Next, an explanation will be given about an ink cartridge as a third embodiment. The ink cartridge of the third embodiment is an ink cartridge containing a water-based ink for ink-jet recording; and the characteristic feature thereof is that the water-based ink for ink-jet recording is the water-based ink for ink-jet recording of the first embodiment. It is possible to use, as a body of the ink cartridge, a publicly known body of ink cartridge.

Next, an explanation will be given about an ink-jet recording apparatus as a fourth embodiment. The ink-jet recording apparatus of the fourth embodiment includes an ink accommodating section and an ink-jet head, and discharges an ink accommodated in the ink accommodating section by the ink-jet head. Further, the ink-jet recording apparatus of the embodiment includes a metal member which comes into contact with the ink; and the characteristic feature of the ink-jet recording apparatus is that the ink cartridge of the third embodiment is accommodated in the ink accommodating section. The metal member which contacts with the ink includes, for example, a metal member in or of the ink-jet head (for example, a filter, an ink channel inside the ink-jet head, etc.), an ink channel up to the ink-jet head, etc. These metal members include or contain, for example, nickel, iron, chrome, etc. The remaining structure and/or constituent parts or component, different from those described above, may be same or equivalent to, for example, those in any conventionally known ink-jet recording apparatus.

As shown in FIG. 1, an ink-jet recording apparatus 1 includes four ink cartridges 2, an ink-jet head 3 including a metal member, a head unit 4, a carriage 5, a driving unit 6, a platen roller 7 and a purge device 8 as main constitutive components or parts.

The four ink cartridges 2 contain four colors of water-based inks respectively, the four colors being yellow, magenta, cyan and black. For example, an ink cartridge 2, among the four ink cartridges 2, which contains the water-based black ink, is the ink cartridge of the third embodiment. The ink-jet head 3 performs recording on a recording medium P such as a recording sheet (recording paper, recording paper sheet). Here, the recording includes, printing text (character, letter), printing image or picture, and printing, etc. The head unit 4 is provided with the ink-jet head 3. The four ink cartridges 2 and the head unit 4 are provided or arranged on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The recording medium (for example, recording sheet) P is supplied or fed from a paper feeding cassette or sheet feeding cassette (not shown) arranged at a side of or at a position below the ink-jet recording apparatus 1. The recording medium P is introduced or guided between the ink-jet head 3 and the platen roller 7. Then, a predetermined recording is performed on the fed or introduced recording medium P with the ink discharged or jetted from the ink-jet head 3. Afterwards, the recording medium P is discharged from the ink-jet recording apparatus 1. In FIG. 1, the paper feeding mechanism and discharging mechanism for the recording medium P are omitted.

The purge device 8 sucks unsatisfactory or degraded ink into and with which air bubbles, etc. accumulated in the ink-jet head 3 enters and mixed. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement (reciprocating movement) of the carriage 5. In FIG. 1, a cap 18 is provided to cover a plurality of nozzles of the ink-jet head 3 which is returned to a reset position upon completion of the printing, so as to prevent the ink from drying.

In the ink-jet recording apparatus, the four ink cartridges may be provided on a plurality of carriages. Alternatively, the ink cartridges may be arranged and fixed inside the ink-jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

The apparatus shown in FIG. 1 adopts the ink-jet head of serial type. However, the embodiment is not limited to this. The ink-jet recording apparatus may be an apparatus adopting a line-type ink-jet head.

Next, an explanation will be given about an ink-jet recording method, as a fifth embodiment. The ink-jet recording method of the fifth embodiment is an ink-jet recording method for performing recording by discharging a water-based ink for ink-jet recording onto an object from an ink-jet head including a metal member, and the characteristic feature thereof is that the water-based ink for ink-jet recording of the first embodiment is used as the water-based ink.

Next, an explanation will be given about a method for preventing corrosion of a metal member, as a sixth embodiment. The method for preventing corrosion of a metal member, of the ink-jet recording apparatus, of the sixth embodiment is a method for preventing corrosion of a metal member, in the ink-jet recording apparatus, caused by a water-based ink for ink-jet recording including the carboxylic acid group-modified self-dispersible carbon black, the metal member contacting with the water-based ink, the method including making the phosphate ion concentration in the water-based ink be not more than 35 ppm. Note that the phrase "preventing corrosion of metal member" is a concept including lowering (reducing) the corrosion of the metal member.

In the method for preventing corrosion of metal member of the sixth embodiment, it is possible to make the kind, blending amount, aspect, etc. of the respective components, such as the colorant, etc. be same as those of the water-based ink for ink-jet recording of the first embodiment.

EXAMPLES

Next, examples of the present teaching will be explained together with comparative examples and reference examples. Note that the present teaching is not limited to the examples, the comparative examples and the reference examples which will be described below.

With a method as explained below, water-based inks having ink compositions shown in TABLES 1 and 2 were prepared; and immersion tests were performed for the prepared water-based inks by immersing metal members (Ni—Co filters) in the prepared water-based ink.

Examples 1-14, Comparative Example 1 and Reference Example 1

First, 10 g of pure water was placed in a ultrafiltration set (MACROSEP 10K OMEGA, produced by Pall Corporation; elimination limit molecule quantity: 1,000), the ultrafiltration set was placed in a centrifugal separator (HIMAC CT15D produced by Hitachi-Koki, Ltd.); and then the centrifugal separator was driven for 10 minutes at 10,000 rpm to thereby clean a filter of the ultrafiltration kit.

Then, after the cleaning, the pure water was discarded and 10 g of self-dispersible carbon black dispersion included in water-base ink composition components (TABLE 1 and TABLE 2) was placed in the ultrafiltration set; the ultrafiltration set was placed in the centrifugal separator; and then the centrifugal separator was driven, performing the centrifugal separation. Here, by changing the driving condition (rotational speed and rotational time) of the centrifugal separator, the phosphate ion concentration in the self-dispersible carbon black was adjusted. For example, in Example 5, the centrifugal separator was driven for 2 hours at 7,000 rpm. Next, the self-dispersible carbon black remaining on the filter of the ultrafiltration set was recovered and was dispersed again in pure water. By repeating the operation using the centrifugal separator and the re-dispersion operation, a required or necessary amount of dispersion of the self-dispersible carbon black (self-dispersible carbon black dispersion) was obtained.

On the other hand, components except for the self-dispersible carbon black dispersion, which were included in the water-based ink composition components (TABLE 1 and TABLE 2), were mixed uniformly or homogeneously to obtain ink solvents. Subsequently, the ink solvents were each added to the self-dispersible carbon black dispersion for which the re-dispersion operation was performed, followed by being mixed uniformly. After that, obtained mixtures were each filtrated through a cellulose acetate membrane filter (pore size 3.00 µm) produced by Toyo Roshi Kaisha, Ltd., and thus water-based inks for ink-jet recording of Examples 1-14, Comparative Example 1 and Reference Example 1 were obtained.

The phosphate ion concentration in each of the water-based inks of Examples 1-14, Comparative Example 1 and Reference Example 1 was measured by means of anion chromatography under the following condition. The measurement results are shown in TABLES 1 and 2.

Measuring Condition for Phosphate Ion Concentration:
 Measuring device: ICS-2000 (model name) produced by Dionex Corporation
 Column: AS18 (model name), 4 mm, produced by Dionex Corporation
 Guard column: AG18 (model name), 4 mm, produced by Dionex Corporation
 Eluent: 5 mmol/L aqueous solution of potassium hydroxide
 Flow rate: 1 mL/min
 Column temperature: 30 degrees Celsius
 Injection rate: 25 µL
 Detection: Electric conductivity (Suppressor method)

Comparative Example 2 and Reference Example 2

Components except for the self-dispersible carbon black dispersion, which were included in the water-based ink composition components (TABLE 2), were mixed uniformly or homogeneously to obtain ink solvents. Subsequently, the ink solvents were each added to the self-dispersible carbon black dispersion, followed by being mixed uniformly. After that, obtained mixtures were each filtrated through a cellulose acetate membrane filter (pore size 3.00 µm) produced by Toyo Roshi Kaisha, Ltd., and thus water-based inks for ink-jet recording of Comparative Example 2 and Reference Example 2 were obtained. The phosphate ion concentration in each of the water-based inks of Comparative Example 2 and Reference Example 2 was measured by means of the anion chromatography under the foregoing condition. The measurement results are shown in TABLE 2.

Comparative Examples 3, 4 and Reference Examples 3, 4

In Comparative Examples 3 and 4, the phosphate ion concentration was adjusted by adding sodium hydrogenphosphate to the water-based ink of Comparative Example 2. In Reference Examples 3 and 4, the phosphate ion concentration was adjusted by adding sodium hydrogenphosphate to the water-based ink of Reference Example 2. The phosphate ion concentration in each of the inks of Comparative Examples 3, 4 and Reference Examples 3, 4 was measured by means of the anion chromatography under the foregoing condition. The measurement results are shown in TABLE 2.

[Immersion Evaluation]

With respect to the water-based inks of Examples 1-14, Comparative Examples 1-4 and Reference Examples 1-4, a Ni—Co filter was immersed in each of the water inks of Examples 1-14, Comparative Examples 1-4 and Reference Examples 1-4 under the following conditions (a) to (c); and nickel elution amount (Ni elution amount) from the Ni—Co filter to each of the water-based inks was measured by using an ICP emission spectrophotometer CIROS-120EOP (model name) produced by Rigaku Corporation. Further, after the immersion period of time was elapsed, the Ni—Co filter was taken out of each of the water-based inks, and the Ni—Co filter was observed visually and microscopically. The evaluation was made based on the results of visual and microscopic observations, in accordance with the following evaluation criterion.

Conditions for Immersion:
 (a) Amount of each of the water-based inks of Examples 1-14, Comparative Examples 1-4 and Reference Examples 1-4: 10 g
 (b) Temperature of the water-based ink: 60 degrees Celsius
 (c) Immersion period of time: 5 days Immersion Evaluation Criterion:
 G: No color change and no rust occurred in the Ni—Co filter
 NG: Color change and rust occurred in the Ni—Co filter The compositions and the measurement and evaluation results of the inks of Examples 1-14 are shown in TABLE 1. The compositions and the measurement and evaluation results of the inks of Comparative Examples 1-4 and Reference Examples 1-4 are shown in TABLE 2.

TABLE 1

|  |  | EX. 1 | EX. 2 | EX. 3 | EX. 4 |
|---|---|---|---|---|---|
| INK COMPOSITION (% by weight) | Carboxylic acid group-modified self-dispersible carbon black dispersion in water*[1] | 6.0 | 6.0 | 6.0 | 6.0 |
|  | glycerol | 23.0 | 23.0 | 23.0 | 23.0 |
|  | dipropylene glycol-n-propyl ether | 2.0 | 2.0 | 2.0 | 2.0 |
|  | 1,2,3-benzotriazole | — | — | — | — |
|  | water | balance | balance | balance | balance |
| Phosphate ion concentration (ppm) |  | 0 | 5 | 15 | 29 |
| Ni elution amount (ppm) |  | 8 | 9 | 9 | 10 |
| Immersion Evaluation |  | G | G | G | G |
|  |  | EX. 5 | EX. 6 | EX. 7 | EX. 8 |
| INK COMPOSITION (% by weight) | Carboxylic acid group-modified self-dispersible carbon black dispersion in water*[1] | 6.0 | 7.0 | 6.0 | 6.0 |
|  | glycerol | 23.0 | 23.0 | 23.0 | 23.0 |

TABLE 1-continued

| | | | | | |
|---|---|---|---|---|---|
| | dipropylene glycol-n-propyl ether | 2.0 | 2.0 | 2.0 | 2.0 |
| | 1,2,3-benzotriazole | — | — | 0.1 | 0.3 |
| | water | balance | balance | balance | balance |
| Phosphate ion concentration (ppm) | | 34 | 33 | 0 | 0 |
| Ni elution amount (ppm) | | 11 | 10 | 0.6 | 0.4 |
| Immersion Evaluation | | G | G | G | G |

| | | EX. 9 | EX. 10 | EX. 11 | EX. 12 |
|---|---|---|---|---|---|
| INK COMPOSITION (% by weight) | Carboxylic acid group-modified self-dispersible carbon black dispersion in water*[1] | 6.0 | 6.0 | 6.0 | 6.0 |
| | glycerol | 23.0 | 23.0 | 23.0 | 23.0 |
| | dipropylene glycol-n-propyl ether | 2.0 | 2.0 | 2.0 | 2.0 |
| | 1,2,3-benzotriazole | 0.1 | 0.3 | 0.1 | 0.3 |
| | water | balance | balance | balance | balance |
| Phosphate ion concentration (ppm) | | 5 | 5 | 15 | 15 |
| Ni elution amount (ppm) | | 0.7 | 0.6 | 2 | 1 |
| Immersion Evaluation | | G | G | G | G |

| | | EX. 13 | EX. 14 |
|---|---|---|---|
| INK COMPOSITION (% by weight) | Carboxylic acid group-modified self-dispersible carbon black dispersion in water*[1] | 6.0 | 6.0 |
| | glycerol | 23.0 | 23.0 |
| | dipropylene glycol-n-propyl ether | 2.0 | 2.0 |
| | 1,2,3-benzotriazole | 0.1 | 0.3 |
| | water | balance | balance |
| Phosphate ion concentration (ppm) | | 29 | 29 |
| Ni elution amount (ppm) | | 6 | 5 |
| Immersion Evaluation | | G | G |

*[1]Prepared by the method described in PCT International Publication WO2006/066132; numerical values in the table each indicate pigment solid content amount.
The unit of the blending mount is % by weight.

TABLE 2

| | | COM. EX. 1 | COM. EX. 2 | COM. EX. 3 | COM. EX. 4 |
|---|---|---|---|---|---|
| INK COMPOSITION (% by weight) | Carboxylic acid group-modified self-dispersible carbon black dispersion in water*[1] | 6.0 | 6.0 | 6.0 | 6.0 |
| | Sulfonate group base-modified self-dispersible carbon black dispersion in water*[2] | — | — | — | — |
| | glycerol | 23.0 | 23.0 | 23.0 | 23.0 |
| | dipropylene glycol-n-propyl ether | 2.0 | 2.0 | 2.0 | 2.0 |
| | water | balance | balance | balance | balance |
| Phosphate ion concentration (ppm) | | 44 | 58 | 100 | 150 |
| Ni elution amount (ppm) | | 78 | 175 | 160 | 167 |
| Immersion Evaluation | | NG | NG | NG | NG |

| | | REF. EX. 1 | REF. EX. 2 | REF. EX. 3 | REF. EX. 4 |
|---|---|---|---|---|---|
| INK COMPOSITION (% by weight) | Carboxylic acid group-modified self-dispersible carbon black dispersion in water*[1] | — | — | — | — |
| | Sulfonate group base-modified self-dispersible carbon black dispersion in water*[2] | 6.0 | 6.0 | 6.0 | 6.0 |
| | glycerol | 23.0 | 23.0 | 23.0 | 23.0 |
| | dipropylene glycol-n-propyl ether | 2.0 | 2.0 | 2.0 | 2.0 |
| | water | balance | balance | balance | balance |
| Phosphate ion concentration (ppm) | | 0 | 58 | 100 | 150 |
| Ni elution amount (ppm) | | 6 | 5 | 6 | 5 |
| Immersion Evaluation | | G | G | G | G |

*[1]Prepared by the method described in PCT International Publication WO2006/066132; numerical values in the table each indicate pigment solid content amount.
*[2]Prepared by the method described in PCT International Publication WO2006/066132; numerical values in the table each indicate pigment solid content amount.
The unit of the blending mount is % by weight.

As shown in TABLE 1, in Examples 1-6 in which the phosphate ion concentration was not more than 35 ppm, the Ni elution amount was small that was not more than 11 ppm and the results of immersion evaluation were also satisfactory. Further, in Examples 7-14 in which 1,2,3-benzotriazole was blended, the Ni elution amount was greatly reduced to be not more than 6 ppm, and the results of immersion evaluation were also extremely satisfactory. On the other hand, in Comparative Examples 1-4 in which the phosphate ion concentration exceeded 35 ppm, the Ni elution amount was great that was not less than 78 ppm, and the results of immersion evaluation were also inferior. Further, in Reference Examples 1-4 in which Sulfonate group base-modified self-dispersible carbon black was used, the Ni elution amount was small that was not more than 6 ppm irrespective of the phosphate ion concentration, and the results of immersion evaluation were also satisfactory. It is appreciated from the results regarding Reference Examples 1-4 that in the inks which do not contain the carboxylic acid group-modified self-dispersible carbon black, the phosphate ion concentration does not have any effect on the corrosion of the metal.

As described above, the water-based ink of the aspect of the present teaching has the excellent water resistance and is capable of lowering or preventing the corrosion of metal member contacting with the water-based ink in the ink-jet recording apparatus. The usage or application of the water-based ink of the aspect of the present teaching is not specifically limited, and the water-based ink of the aspect is widely applicable to a variety of kinds of ink-jet recording.

What is claimed is:

1. A water-based ink for ink-jet recording comprising:
   a self-dispersible carbon black modified by carboxylic acid group in a weight concentration of from 1 weight % to 10 weight %;
   a water; and
   a water-soluble organic solvent;
   wherein a weight concentration of phosphate ion in the water-based ink for ink-jet recording is from 5 ppm to not more than 35 ppm, and the water-based ink for ink-jet recording fulfills a following condition (I):

$$5/6 \leq (P)/(B) \leq 34/6 \quad \text{(I)},$$

in condition (I):
   (P): the weight concentration of phosphate ion in the water-based ink for ink-jet recording in ppm; and
   (B): the weight concentration of the self-dispersible carbon black modified by carboxylic acid group in the water-based ink for ink-jet recording in weight %.

2. The water-based ink for ink-jet recording according to claim 1, further comprising 1,2,3-benzotriazole.

3. The water-based ink for ink-jet recording according to claim 2, wherein a blending amount of 1,2,3-benzotriazole in the water-based ink for ink-jet recording is 0.005% by weight to 5% by weight.

4. The water-based ink for ink-jet recording according to claim 1, wherein the weight concentration of phosphate ion in the water-based ink for ink-jet recording is 15 ppm to 35 ppm.

5. The water-based ink for ink-jet recording according to claim 1, wherein the self-dispersible carbon black modified by carboxylic acid group is present in an amount of 6% by weight to 7% by weight in the water-based ink.

6. The water-based ink for ink-jet recording according to claim 1, wherein the water-based ink for inkjet recording includes
   glycerol and dipropylene glycol-n-propyl ether as the water-soluble organic solvent; and
   1,2,3-benzotriazole.

7. The water-based ink for ink-jet recording according to claim 1, wherein the self-dispersible carbon black modified by carboxylic acid group is a self-dispersible carbon black from which phosphate ion is removed by an ultrafiltration method.

8. The water-based ink for ink-jet recording according to claim 1, wherein the water-based ink contains a carbon black dispersion containing the self-dispersible carbon black modified by the carboxylic acid group, the water, and the phosphate ion.

* * * * *